United States Patent
Linzer et al.

(10) Patent No.: US 7,902,268 B2
(45) Date of Patent: *Mar. 8, 2011

(54) WATER SOLUBLE ENERGY CURABLE STEREO-CROSSLINKABLE IONOMER COMPOSITIONS

(75) Inventors: Volker Linzer, Carlstadt, NJ (US); Richard M. Jones, Oak Ridge, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 938 days.

This patent is subject to a terminal disclaimer.

(21) Appl. No.: 11/600,941

(22) Filed: Nov. 17, 2006

(65) Prior Publication Data

US 2007/0066701 A1    Mar. 22, 2007

Related U.S. Application Data

(63) Continuation of application No. 10/702,313, filed on Nov. 6, 2003, now Pat. No. 7,226,959.

(51) Int. Cl.
   *C08F 291/06*    (2006.01)
(52) U.S. Cl. .......... 522/144; 525/309; 524/556; 524/236
(58) Field of Classification Search .......... 522/144; 524/556, 236; 525/309
   See application file for complete search history.

(56) References Cited

U.S. PATENT DOCUMENTS

| | | | |
|---|---|---|---|
| 3,425,977 A | 2/1969 | Skoultchi et al. | |
| 3,825,430 A | 7/1974 | Kurka | |
| 3,862,067 A | 1/1975 | Motier et al. | |
| 4,275,142 A | 6/1981 | Hosaka et al. | |
| 4,401,793 A | 8/1983 | Chiao et al. | |
| 4,745,138 A | 5/1988 | Thanawalla et al. | |
| 5,393,643 A | 2/1995 | Lundy et al. | |
| 5,554,712 A | 9/1996 | Huynh-Tran et al. | |
| 5,633,307 A | 5/1997 | Das et al. | |
| 5,868,605 A | 2/1999 | Cesna | |
| 6,017,982 A | 1/2000 | Akinmade | |
| 6,099,415 A | 8/2000 | Lutz | |
| 6,180,040 B1 | 1/2001 | Ladd et al. | |
| 6,207,346 B1 | 3/2001 | Johnson | |
| 6,281,271 B1 | 8/2001 | Rumphorst et al. | |
| 6,559,222 B1 | 5/2003 | Rooney et al. | |
| 7,226,959 B2 * | 6/2007 | Linzer et al. ............ | 522/120 |

FOREIGN PATENT DOCUMENTS

| GB | 2257711 | | 1/1993 |
|---|---|---|---|
| GB | 2257711 A | * | 1/1993 |
| WO | WO-99/19369 | | 4/1999 |

* cited by examiner

*Primary Examiner* — Satya B Sastri
(74) *Attorney, Agent, or Firm* — Dickstein Shapiro LLP

(57) ABSTRACT

A homogenous, aqueous, energy curable, stereo cross linkable ionomer containing coating composition and a method of preparing same.

10 Claims, No Drawings

WATER SOLUBLE ENERGY CURABLE STEREO-CROSSLINKABLE IONOMER COMPOSITIONS

This is a continuing application of application Ser. No. 10/702,313, filed Nov. 6, 2003, now U.S. Pat. No. 7,226,959.

FIELD OF THE INVENTION

This invention relates to the synthesis and use of water soluble energy curable stereo crosslinkable ionomers used in the manufacture of coated and printed materials.

BACKGROUND OF THE INVENTION

Ionomers are polymeric compounds carrying electronic charges within the polymer chain. Ionomers build outstanding properties like hardness and solvent resistance when two or more such polymeric chains create a ladder-type structure by salt formation. The ionic complexation of identical (e.g., bridged by a higher-valent counterion) or opposing charges (e.g., acid/base neutralization of amine-functional with carboxyl-functional polymeric species) on the polymer chains results in additional crosslinks, the number per unit volume of which determines the mechanical strength of the resulting solid. The more commonly used ionic complexation route typically proceeds through use of a more stable complex of the bridging counterion with a volatile material (e.g. ammonia) to allow blending in the liquid state followed by later crosslinking upon drying to a solid. The acid/base neutralization of two oppositely charged ionomers to create crosslinking, in contrast, is largely impractical due to the impossibility of blending these materials to generate anything other than an intractable crosslinked solid.

DESCRIPTION OF RELATED ART

The photopolymerization approach to ionomer crosslinking is not novel. U.S. Pat. Nos. 6,281,271 and 6,017,982 disclose the energy curing of ethylenically unsaturated ions to build covalent molecular weight in-situ and to trigger crosslinking via ionic complexation of identical charges on two or more ionomer chains, in the presence of water and a divalent metaloxide. U.S. Pat. No. 6,180,040 teaches the formation of an ionomer via photopolymerization using energy curable compositions of ionic monomers such as metal acrylic carboxylates copolymerized with polybutadiene resins. These compounds form ionomers upon polymerization and are bridged over a metal complex in a second (vulcanization) step. In neither of these examples is the bridging ion an organic polymer, either preexisting or formed by in-situ polymerization. Fundamentally, the ionic complexation routes illustrated in the above references yield materials with regular, repeating crosslink patterns and compact ionic structures.

Ionomers that crosslink only over ethylenically unsaturated moieties (i.e., do not employ either bridging ions or acid/base combinations of separate, oppositely charged ionomers or monomers) are commonly used in coatings and photoresists. These compounds are usually water soluble polymers carrying ethylenically unsaturated groups in or grafted onto the polymer chain of the single-chain ionomer. Examples of these polymer types are neutralized acrylics described in U.S. Pat. No. 4,275,142; styrene-maleic anhydride described in U.S. Pat. Nos. 3,825,430 and 4,401,793; and polyester, or urethane polymer salts described in U.S. Pat. Nos. 6,207,346 and 5,554,712. Since no use is made of the ionic groups to create additional crosslinks, cured films made from these ionomers are often structurally weakened by the existence of ionic charges, as these sites retain moisture, which plasticizes the cured final polymer (e.g., they show lower rub resistance to water compared to uncharged polymers).

U.S. Pat. Nos. 4,745,138; 5,868,605 and 6,099,415 disclose the use of chemically similar but non-neutralized resins in energy curing compositions. However, these patents do not teach the formation of blends with resins, oligomers, or monomers that could potentially neutralize an energy curable resin in a way that might crosslink the polymer. In addition, the viscosity of these non-neutralized resins is typically high. To bring them to application viscosity they must be diluted with either a large amount of a low viscosity reactive monomer or with a solvent.

SUMMARY OF THE INVENTION

The invention is the formation and use of water soluble energy curable ionomers that form a stereo crosslinked network upon curing over ethylenically unsaturated and polyionic sites. As a result, energy curable stereo-crosslinkable ionomers are produced that deliver a low viscosity liquid and create a cured solid film having superior mechanical and solvent resistance properties along with good adhesion to difficult substrates. The materials also resist cracking and flaking, and offer improve gloss and rub resistance, and enhanced coverage when compared to existing materials used in formulating paints, inks, and coatings.

DETAILED DESCRIPTION

The present invention shows how in-situ photopolymerization can be used to generate the opposing charge type of polymer from low-viscosity liquid monomer/oligomer blends that have utility in the manufacture of coated and printed materials. The structures formed in the present invention are random, largely amorphous, three-dimensional networks of opposing charge polymers with control over the rigidity of the crosslink. The invention employs lower molecular weight oligomeric resins and water as solvent to reduce viscosity and accelerate cure at zero volatile organic content (VOC). Cure occurs in the presence of the water, and the dissolved water is allowed to concurrently dry without application of additional energy to give cured structures that are surprisingly not sensitive to water. The oligomeric resins are neutralized with ethylenically unsaturated polyamines to form water-soluble resin salts. In some instances these salts are liquids (low melting solids), but more generally they require a water content above 10% to be fluid. In most instances, in order to provide useful viscosity, the water content will be above 30%.

In water based energy curable compositions, viscosity reducing monomeric compounds, typically employed in energy curable compositions are replaced with water. There are two fundamentally different technologies used in this field. One derives from ethylenically unsaturated water based emulsions, which are dried before curing. The other is based on partially soluble energy curable material where the curing reaction is carried out in solution and does not necessarily include a drying step before cure. The precursors employed in the present invention are water soluble at least partially water-soluble, a state that is obtained from the use of truly water soluble monomers and oligomers in admixture with the required ionic materials.

Ethylenically Unsaturated Resin

The water soluble ethyleneically unsaturated oligomeric or polymeric resin may have acid functional groups (e.g. carboxylic acid groups) which are partially or totally neutralized with a base (e.g., an amine) to form a water soluble resin salt. Alternatively, the resin may have basic functional groups (e.g. amino groups) which are partially or totally neutralized with an acid (e.g. a carboxylic acid) to form a water soluble resin salt. A preferred embodiment is a neutralization product, where a water soluble, acrylated, resin salt is formed from an ethylenically unsaturated energy curable resin containing acrylic groups, methacrylic groups or a combination thereof; and carboxylic acid functional groups, neutralized by a base. While a more preferred resin salt product is a neutralization product prepared from an ethylenically unsaturated amine and a polyanionic resin. Suitable examples of a polyanionic resin are polyacrylic or styrene-maleic anhydride copolymers, containing carboxyl groups, and having an acid value of at least 80 (mg KOH per 100 g polymer). Commercially available examples of such resin are Carboset GA-1167 from BF Goodrich; Joncryl 690 from SC Johnson; and SMA 1000 from ELF Atochem. It is preferred that the polyanionic resin be partially esterified via a polymer analog reaction to tailor the final properties of the compound and the final product of compositions containing the compound (propanol, isopropanol, stearic alcohol, polypropylene glycol) but that such resin have the same acid number of 80. A preferred modification uses an ethylenically unsaturated alcohol to form an ethylenically unsaturated polyanionic resin containing at least two such functions per molecule. The resin is then neutralized to a pH of at least 5.5 with an ethylenically unsaturated amine or a mixture such amine and ammonia or other caustic component. If there is no ethylenically unsaturated content in the polyanionic resin, then the tertiary amine should be ethylenically unsaturated. If the polyanionic resin is ethylenically unsaturated, then the tertiary amine may be saturated provided that it contains at least two amine groups per molecule. However, it is most preferred that both components of the resin be ethylenically unsaturated.

A particularly preferred energy curable resin is a styrene/maleic anhydride copolymer partially esterified with a hydroxy alkyl acrylate or methacrylate. The hydroxy alkyl acrylate or methacrylate preferably of such resin is preferably hydroxy butyl acrylate or methacrylate. A partially esterified styrene/maleic anhydride copolymer may be neutralized without further modification or it may be further partially esterified with an alkanol such as butanol, propanol, ethanol and the like.

The acidic or carboxylic acid (anhydride) groups of the energy curable resin are partially or totally neutralized to provide a resin having the desired range of water solubility while retaining complete miscibility with other water soluble resins.

The resins used to form the compositions of the present invention while having an acid number of at least 80 have a molecular weight between 1,000 and 25,000; and more preferably between 1,000 and 10,000; and most preferably between 1,000 and 5,000.

Neutralization Agent

Any basic compound (e.g., alkali metal hydroxides such as calcium hydroxide, potassium, hydroxide and sodium hydroxide, ammonia, amines, etc.) may be used to neutralize the acidic groups of the resin. Preferred are ammonia, amines or combinations thereof. Even more preferred is amines, while more particularly preferred is an ethylenically unsaturated tertiary amine. By employing ethylenically unsaturated tertiary amines as the neutralizing agent, the acidic groups on the energy curable resin are totally neutralized to form a water soluble resin having additional polymerizable ethylenic groups. The use of ethylenically unsaturated tertiary amines as the neutralizing agent further allows the acid groups on the resin to be totally neutralized which aids in the formation of the stereo cross-linkable water soluble ionomers of the present invention.

The ethylenically unsaturated tertiary amine neutralizing agent of the present invention has the formula:

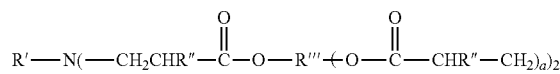

wherein R' is a short chain hydrocarbon group; R" is H or a methyl group; and R''' is selected from the group consisting of $C_1$ to $C_{20}$ alkylene, $C_1$ to $C_{20}$ aralkylene, $C_1$ to $C_{20}$ alkyl substituted aralkylene and $C_1$ to $C_{20}$ oxyalkylated derivatives thereof; and a is 1, 2, or 3.

Preferably the ethylenically unsaturated tertiary amine is a Michael Addition product of a primary or secondary amine (e.g., an alkyl amine) and two acrylic esters, wherein each of the acrylic esters contains two or more acrylate or methacrylate groups (e.g., wherein the acrylic ester is an acrylate ester or methacrylate ester of an alkane diol, a polyether diol, a glycol, a glycerol). The primary or secondary amine may be selected, for example, from ethyl amines, ethanol amines, diethanol amines and hexamethylene imines and combinations thereof. The acrylic ester may be selected from hexanediol diacrylate, dipropylene glycol diacrylate (DPGDA), tripropylene glycol diacrylate (TPGDA), trimethylolpropane triacrylate (TMPTA), pentaerythritol triacrylate (PETA) and combinations thereof. Examples of commercially available acrylic functional amines are Laromer 8996 (available from BASF); Ebecryl 7100 (available from UCB); Suncure 175 (available from Reichhold); and Ebecryl P-104 (available from UCB).

Stereo Cross-Linkable Ionomer

It should be noted that the monomeric/oligomeric nature of the ionomer components results in a random distribution of the cationic and anionic charges within the ionomer network. This differs from existing preformed polymeric ionomer pairs in which one of the pair of polymers contains cationic charges while the other contains anionic charges. In the present invention, stereo cross-linkable is defined as the ability of the oligomeric ionomers to randomly polymerize in-situ via two different mechanisms. The first mechanism being a covalent free radical photopolymerization of the resin. The second mechanism being an ionic cross-link between the acidic and basic functional groups of the resin in multiple dimensions at the same time, to form a highly crosslinked polymeric network of infinite molecular mass. For example, the ethylenically unsaturated tertiary amine neutralizing agent provides the counter ion for the acidic ethylenically unsaturated resin, which allows the ionomer formed, to stereo polymerize during photoreaction (via energy curing) and form an additional cross-linked network over the ethylenically unsaturated groups as well as over the ionic structure of the resin. Therefore, unlike other water based energy curable resin technology, where the resistance properties to be imparted by the cured resin composition depend on, and are a function of, the evaporation of the base (e.g. ammonia), for example, which shifts the acid base equilibrium in the post cure composition, here for example, the ethylenically unsaturated tertiary amine neutralizing base, and neutralized resin form an additional cross-linked network instantly on both sides of the ionomer.

Upon irradiation, either or both of the ions formed from the two oligomeric material formations increase in molecular weight by addition polymerization. The use of (meth)acrylic functional, carboxylic polymeric, and tertiary amine oligomeric resins in an energy curing mechanism results in the formation of a crosslinked ionomer with a ladder structure via the formation of covalent bonds as well as opposing ionic bonds. It is essential that one oligomeric material polymerizes but it is preferred that they both polymerize. After polymerization, a highly crosslinked structure is formed showing exceptional properties over conventional and "water-compatible" energy curable materials existing in the prior art. The use of the present composition in energy curable leads to improved cure, adhesion, hardness, mechanical and solvent resistance properties.

The water solubility of the polymeric resin salt of the present invention makes it especially suitable for water based energy curing processes while the organic acid/base crosslinking works against the tendency of ionic polymers to become mechanically weaker upon absorption of water. The control of the molecular weight between acidic and basic sites on separate oligomers allows for the formation of highly crosslinked materials which show much less brittle failure than expected for crosslinked ionomers.

For the synthesis of the resin salt three processes can be used. The first process starts from a solid carboxylic resin, which will be diluted in tertiary acrylic amine and optionally, water. The second process starts with the polymer analog reaction of alcohols with the styrene maleic anhydride resin in a solvent. In a solvent stripping step, the resin will be neutralized and diluted with tertiary acrylic amine. In the third process the solvent of the previous described ester modified resin will be azeotropically distilled with water and partially neutralized with ammonia. Afterward the resin is further neutralized with acrylated amine at 60° C.

EXAMPLE 1 (COMPARATIVE)

SMA-1000 (40 grams, available from Atofina) solid is slurried into water (50 grams) and neutralized to pH 6.5 with concentrated NH.sub.4OH (available from Fisher Scientific). The resulting solution was 43% in solids content and had a 31 Pa·s viscosity at 40° C.

EXAMPLE 2

SMA-1000 (40 grams, available from Atofina) solids is slurried into water (50 grams) and neutralized to pH 6.5 with di(2-hydroxyethyl)methyl amine (15 grams, available from Aldrich) with heating to 50° C. for 12 hours. The resulting solution was 50% solids in content and had a 30 Pa·s viscosity at 10 s−1 at 40° C.

EXAMPLE 3

SMA-1000 (35 grams, available from Atofina) solids is slurried into water (50 grams) and neutralized to pH 4.5 with concentrated $NH_4OH$ (5 grams, available from Fisher Scientific) followed by addition of acrylated amine 16-101 (10 grams, available from Reichhold) and heating to 60° C. for 4 hours. After cooling, the resulting solution was corrected to pH 6.5 with additional concentrated ammonia and measured to be 48% in solids content and had a 48 Pa·s viscosity at 10 s−1 at 40° C.

EXAMPLE 4 (COMPARATIVE)

As described in U.S. Pat. No. 6,559,222, polymeric resin salt, styrene maleic anhydride copolymer (165 grams) having an acid number of 480 and an average molecular weight of 1000 were added together under agitation to methyl isobutyl ketone (MIBK, 120 grams). The two materials were then heated to approximately 95-110 degrees C. over 1 to 2 hours under a nitrogen blanket. Next, N,N -dimethylbenzyl amine (0.8 grams) and a monofunctional alcohol (18 grams) such as n-propanol, ethanol or octadecanol were then added to form a polymeric mixture having an acid number between 200 to 210. The nitrogen blanket was then removed and 4-methoxyphenol (0.12 grams) and N,N-dimethylbenzylamine (0.36 grams) were added. Over a period of time, for example 60 to 90 minutes, a hydroxy-functional acrylate such as 4-hydroxybutyl acrylate (55.80 grams) or 2-hydroxy-ethyl acrylate was then added until the acid number of the polymeric mixture is between 130 to 140. The polymeric mixture was then distilled and 4-methoxyphenol (0.12 grams) was added along with ammonium hydroxide (27.90 grams) and deionized water (327.8 grams). The mixture was then heated, for example to 99 degrees C. The MIBK and water were then removed by distillation. When all of the MIBK had been removed, the water is returned to the mixture as a water/ammonia distillate. This material was prepared as a 37% in solids content in water and neutralized to pH 6.5 with ammonia yielding 23 Pa·s viscosity at 10 s−1 at 40° C.

EXAMPLE 5

To the resin salt solution (108 grams) as prepared in Example 4 at pH 4.5 (containing 37% resin solids in water prior to the final addition of neutralizing base described in U.S. Pat. No. 6,559,222) at 60.degree. C. was added di(2-hydroxyethyl)methyl amine (10 grams, Aldrich). After cooling, the resulting solution had a pH of 6.5 and was 43% in solids content and 20 Pa·s viscosity at 10 s−1 at 40° C.

EXAMPLE 6

To resin salt solution (100 grams) as prepared in Example 4 at pH 4.5 (containing 37% resin solids in water prior to the final addition of neutralizing base described in U.S. Pat. No. 6,559,222) at 60° C. was added acrylated amine 16-101 (15 grams, Reichhold) over four hours. Upon cooling, the resulting solution was corrected to pH 6.5 with concentrated ammonia and measured to be 48% in solids content and had a 37 Pa·s viscosity at 10 s−1 at 40° C.

EXAMPLE 7 (COMPARATIVE)

Laromer 8765 (20 grams, available from BASF Corporation, Mount Olive, N.J.) was added to the resin salt solution (25 grams) as prepared in Example 1, Irgacure 2959 (1.5 grams, available from Ciba) was then added to this solution. To complete the solution for coating, water (3 grams) and TegoRad 2200N (0.5 grams available from TegoRad Corporation) were added with stirring, and the solution set aside for 12 hours to clear the entrained air before coating and curing. The viscosity of coating solution was 0.35 Pa·s at 25° C.

EXAMPLE 8

Laromer 8765 (17.5 grams, available from BASF) followed by Irgacure 2959 (1.5 grams, available from Ciba) were added with stirring to resin salt solution in water (27 grams) as prepared in Example 2. water (3.5 grams) and TegoRad 2200N (0.5 grams available from TegoRad Corporation) were then added with stirring, and the solution set aside for 12 hours to clear the entrained air before coating and curing. The viscosity of coating solution was 0.38 Pa·s at 25° C.

EXAMPLE 9

Laromer 8765 (17.5 grams, BASF) followed by Irgacure 2959 (1.5 grams, available from Ciba) were added with stirring to resin salt solution in water (30.5 grams) as prepared in Example 3. TegoRad 2200N (0.5 grams available from TegoRad Corporation) was then added with stirring, and the solution set aside for 12 hours to clear the entrained air before coating and curing. The viscosity of coating solution was 0.52 Pa·s at 25° C.

EXAMPLE 10 (COMPARATIVE)

Laromer 8765 (17.5 grams, BASF) followed by Irgacure 2959 (1.5 grams, available from Ciba) were added with stirring to resin salt solution in water (30.5 grams) as prepared in Example 4. TegoRad 2200N (0.5 grams, available from TegoRad Corporation) was then added with stirring, and the solution set aside for 12 hours to clear the entrained air before coating and curing. The viscosity of the coating solution was 0.23 Pa·s at 25° C.

EXAMPLE 11

Laromer 8765 (17.5 grams, available from BASF) followed by Irgacure 2959 (1.5 grams, available from Ciba) were added with stirring to resin salt solution in water (30.5 grams) as prepared in Example 5. TegoRad 2200N (0.5 grams, available from TegoRad Corporation) was then added with stirring, and the solution set aside for 12 hours to clear the entrained air before coating and curing. The viscosity of the coating solution was 0.28 Pa·s at 25° C.

EXAMPLE 12

Laromer 8765 (18.0 grams, available from BASF) followed by Irgacure 2959 (1.5 grams, available from Ciba) were added with stirring to resin salt solution in water (30 grams) as prepared in Example 6. TegoRad 2200N (0.5 grams, available from TegoRad Corporation) was then added with stirring, and the solution set aside for 12 hours to clear the entrained air before coating and curing. The viscosity of the coating solution was 0.25 Pa·s at 25° C.

EXAMPLE 13

The coating solutions described in Examples 7 to 12 were applied by #3 and #5 wire-wound rods to Uncoated Leneta N2A charts (Leneta is a product and trademark of The Leneta Company, 15 Whitney Rd, Mahwah, N.J.). Immediately following coating, the wet film was cured by passing under 650 mJ/cm.sup.2 of UV light (two medium pressure Hg lamps at 300 W/in each, 200 fpm on an RPC Industries processor) in air. The resulting cured surfaces were conditioned at 75° F. and 48% Relative Humidity for one day and the following measurements taken. Gloss was measured at 60-degree angle using a type DIN Geproft 4501 meter from BYK Gardner parallel to the coating direction. The rub resistance (an methyl ethyl ketone (MEK) rub and water rub test) was determined by wetting the cured coating surface and employing light finger pressure to rub the coating off as detected by the exposure of the underlying ink. The number of complete back-and-forth cycles required were recorded. Coating adhesion was measured by taking a convenient length of 610 tape (available from 3M Co., St. Paul, Minn.), laminating the tape to the cured surface under finger pressure, then lifting the tape from the surface in one rapid motion at right angle to the coated surface. The adhesion was rated a pass when the coating remained completely intact and adhered to the substrate following tape peel. The coating weight was determined gravimetrically by the difference in weight between a 10 cm.times.10 cm piece cut from the coated area and an identical size piece cut from a similar area of uncoated stock. Each measurement reported in Table 1 below is normalized to the same dry coating weight (4 g/m$^2$).

TABLE 1

| Example | Gloss | MEK Rub | Water Rub | Adhesion |
|---|---|---|---|---|
| 7 (comparative) | 65 | 6 | 5 | fail |
| 10 (comparative) | 89 | 12 | 18 | pass |
| 11 | 91 | 12 | 16 | pass |
| 12 | 95 | 35 | 20 | pass |

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A composition which is an aqueous, energy curable, homogenous, solution comprising the neutralization product of
   (a) an ethylenically unsaturated acidic resin containing carboxylic acid groups, and
   (b) an ethylenically unsaturated amine of the formula

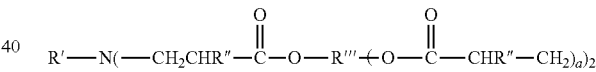

wherein R' is a short chain hydrocarbon group; R" is H or a methyl group; and R''' is selected from the group consisting of $C_1$ to $C_{20}$ alkylene, $C_1$ to $C_{20}$ aralkylene, $C_1$ to $C_{20}$ alkyl substituted aralkylene and $C_1$ to $C_{20}$ oxyalkylated derivatives; and a is 1, 2, or 3; in
   (c) more than 10% but less than 30% by weight of water; where upon curing with an actinic radiation source, a stereo-crosslinked ionomer forms offering the composition an increased cross-linked density.

2. The composition of claim 1 wherein the ethylenically unsaturated resin is a styrene/maleic anhydride copolymer, partially esterified with a hydroxy alkyl acrylate or methacrylate functional group.

3. The composition according to claim 1, wherein the ethylenically unsaturated resin has an acid number of at least 80 and a weight average molecular weight between 1,000 and 50,000.

4. The composition according to claim 3, wherein the ethylenically unsaturated resin has an acid number of at least 80 and a weight average molecular weight between 1,000 and 25,000.

5. The composition according to claim 4, wherein the ethylenically unsaturated resin has an acid number of at least 80 and a weight average molecular weight between 1,000 and 10,000.

6. The composition according to claim 1, wherein the ethylenically unsaturated acidic resin contains acrylic functional groups, methacrylic functional groups or a combination thereof.

7. The composition of claim 6 wherein the ethylenically unsaturated resin is a styrene/maleic anhydride copolymer, partially esterified with a hydroxy alkyl acrylate or methacrylate functional group.

8. A method for preparing an energy curable coating comprising employing the composition of claim 1.

9. An energy curable coating comprising the composition of claim 1.

10. An energy curable coating comprising the composition of claim 6.

* * * * *